United States Patent [19]

Copeman

[11] Patent Number: 5,948,284
[45] Date of Patent: Sep. 7, 1999

[54] EQUALIZING CAM ROCKER FIXTURE ASSEMBLY FOR A RESISTANCE WELDING GUN

[75] Inventor: David G. Copeman, Sterling Heights, Mich.

[73] Assignee: Aromac, Inc., Wadsworth, Ohio

[21] Appl. No.: 09/065,469

[22] Filed: Apr. 23, 1998

Related U.S. Application Data

[60] Provisional application No. 60/045,493, May 2, 1997.

[51] Int. Cl.⁶ .................................................. B23K 11/31
[52] U.S. Cl. .................................... 219/86.33; 219/86.25; 219/89; 269/34
[58] Field of Search ............................. 219/86.25, 86.33, 219/86.61, 89, 90; 269/32, 34, 237, 238, 233

[56] References Cited

U.S. PATENT DOCUMENTS

| | | |
|---|---|---|
| Re. 33,798 | 1/1992 | Waltonen . |
| 1,980,228 | 11/1934 | Rogers . |
| 2,879,373 | 3/1959 | Fagge .................................. 219/89 |
| 3,008,032 | 11/1961 | Wolfbauer . |
| 3,008,034 | 11/1961 | Wolfbauer . |
| 3,136,879 | 6/1964 | Waltonen . |
| 3,270,604 | 9/1966 | Waltonen . |
| 3,299,247 | 1/1967 | Waltonen . |
| 3,396,260 | 8/1968 | Waltonen . |
| 3,679,859 | 7/1972 | Comeau . |
| 4,098,161 | 7/1978 | Bloch . |
| 4,410,782 | 10/1983 | Konno et al. ......................... 219/89 |
| 4,500,768 | 2/1985 | Rossell ................................ 219/86.25 |
| 4,549,457 | 10/1985 | Bloch et al. . |
| 4,763,550 | 8/1988 | Waltonen et al. . |
| 4,771,160 | 9/1988 | Pitsch et al. . |
| 4,810,849 | 3/1989 | Heideman . |
| 4,947,018 | 8/1990 | Cooley et al. ...................... 219/86.25 |
| 5,036,175 | 7/1991 | Umeda . |
| 5,099,099 | 3/1992 | Saito . |
| 5,252,801 | 10/1993 | Angel et al. . |
| 5,762,325 | 6/1998 | Blatt .................................... 269/32 |

*Primary Examiner*—Gregory Mills
*Attorney, Agent, or Firm*—Vanophem Meehan & Vanophem, P.C.

[57] ABSTRACT

An apparatus for contacting and applying a force to opposite sides of a workpiece, such as a resistance welding device adapted for use on an automated assembly line. The apparatus is configured to be extremely rigid to ensure accurate movement and positioning of a pair of contacts with respect to a workpiece. The apparatus includes a frame member supported by a base with first and second shafts that are secured to the frame member and slidably supported by the base. The second shaft prevents rotation of the frame member about the first shaft during operation of the apparatus. The frame member carries one of the contacts, and is biased away from the workpiece and toward a second position nearer the workpiece. An extendable member and a link are both pivotably mounted to the frame member, and support an anvil carrying the remaining contact. The link is engaged with the base when the link is in a first rotational position, at which point the second contact is held away from the workpiece by the anvil. The link disengages the base when the link rotates to a second rotational position, at which point the second contact is lowered adjacent the workpiece by the anvil. When engaged with the base, the link overcomes the biasing force applied to the frame member and forces the frame member away from the workpiece. When the link is disengaged from the base, the frame member is biased toward the workpiece.

20 Claims, 7 Drawing Sheets

EQUALIZING CAM ROCKER FIXTURE ASSEMBLY FOR A RESISTANCE WELDING GUN

CROSS REFERENCE TO RELATED APPLICATIONS

This application claims the benefit of U.S. Provisional Application No. 60/045,493, filed May 2, 1997.

BACKGROUND OF THE INVENTION

1. Field of the Invention

The present invention generally relates to mechanisms for equalizing the movement of opposing members toward a workpiece and the pressure applied by the members to opposite sides of the workpiece. More specifically, this invention relates to an equalizing mechanism for a welding gun suitable for use on automated assembly lines, wherein the mechanism equalizes the movement of a pair of electrode tips toward a workpiece and thereafter the pressure applied by the electrode tips to opposite sides of the workpiece while the workpiece is being welded.

2. Description of the Prior Art

Electric welding guns, and particularly resistance welding guns, are widely used in mass production to join workpieces to form permanent assemblies. Resistance welding guns are especially suited for use on automated automobile assembly lines where body panels, such as doors and hoods, and their support structures are welded together to form subassemblies, which are then welded to the frame or unit construction of an automobile. Generally, resistance welding is a process that, through the application of heat and pressure, coalesces two or more workpieces, such as metal sheets or panels, without the use of fluxes or filler metals to form a permanent joint. The necessary heat is generated by the resistance of the workpieces to the flow of an electric current between two electrodes that serve as terminals for an electrical circuit. During the welding process, the electrodes contact opposite sides of workpieces to be welded so as to firmly clamp the workpieces together.

The application of force through the electrodes is beneficial in that it assures a firm contact between the workpieces being welding, and also assures that a sufficient electrical contact between the workpieces and the electrodes is made. However, excessive force must be avoided where the workpieces being welded are thin and, therefore, susceptible to deformation from excessive impact loads. This is particularly true in the automotive industry where the demand for lighter-weight vehicles has resulted in the use of thinner sheet metal. In view of the high forces that must typically be applied to ensure sufficient contact between the electrodes and the sheet metal, deformation often becomes a recurring problem on automobile assembly lines.

Welding guns typically used on automated assembly lines include a pair of arms, at least one of which is pivotably mounted to a base, with each arm being fitted with an electrode. Where each arm is pivotably mounted, a cylinder is often attached to the opposite end of each arm to rotate the arms relative to each other at a predetermined rate. If only one arm is pivotably mounted, as disclosed in U.S. Pat. No. 3,299,247 to Waltonen, a camming device may be employed to control the orientation of the moving electrode so that the final motion of the moving electrode is roughly linear toward the stationary electrode to accommodate electrode deterioration and variances in workpiece thickness. In each case, one of the electrodes will typically come in contact with the workpiece prior to the second electrode, such that the workpiece is at least initially subject to unequal loading by the electrodes. While low asymmetric loading does not typically cause excessive deformation during assembly operations with thick workpieces, moderate asymmetric loads can cause unacceptable deformation of relatively thin workpieces, such as automotive body panels.

Several approaches for minimizing asymmetric clamping forces applied by welding gun electrodes have been suggested in the prior art. An early approach taught by U.S. Pat. No. 1,980,228 to Rogers was to provide adjustment to the force applied by a pair of compression springs. Rogers disclosed an eccentric pin which, when rotated, adjusted the gap between a pair of electrodes when the electrodes were subject to the force of the springs urging the electrodes together. However, the welding gun taught by Rogers is not well suited for use on an automated assembly line in that the actual force imposed by the electrodes on the workpiece depends upon possible variations in thicknesses of the workpiece. Reliance on springs for force equalization on a workpiece is also taught in U.S. Pat. Nos. 3,008,032 and 3,008,034 to Wolfbauer, Jr., and U.S. Pat. No. 4,549,457 to Bloch, each of which further incorporates a camming device to rotate a tool and anvil into position on opposite sides of a workpiece. Notably, considerable force is applied to the cam rollers and tracks of U.S. Pat. No. 3,008,034 during welding when the workpiece is clamped between the electrodes, with the potential for significantly shortening the service lives of the rollers and tracks.

An approach taught by U.S. Pat. No. 5,036,175 to Umeda relies on a spring and cylinder combination to equalize the force imposed by two welding electrodes, one of which is mounted on a rotating arm while the other is mounted on a linearly moving arm. Umeda employs an intermediate linkage between the arms to urge the linearly moving arm away from the workpiece under the opposing force of the spring operating on a sliding portion of the arm. As the cylinder begins to move the rotating arm into position for welding, the linkage gradually releases the linearly moving arm, allowing it to come into contact with the workpiece under the force imposed by the spring. Without a camming device, the path of the rotating arm does not include a linear portion that accommodates electrode deterioration and variances in workpiece thickness.

The durability of a welding gun and other clamping-type devices that employ similarly moving arms depends in part on the wear of the components, and particularly the pivots, sliders and rollers that maintain the proper orientation of the moving components throughout the operating cycle of the device. In particular, side loads on pivot pins and cam rollers and nonaxial rotational loads on sliding members lead to premature failure of these components. It can be appreciated that each of the prior art resistance welding guns discussed above achieves certain operational advantages. However, the components that provide such advantages can negatively affect the durability of the welding gun. For example, Umeda provides for equalization of the electrode clamping load with a spring-loaded sliding member that is subject to high rotational (nonaxial) loading. The durability of Umeda's welding gun is dependent in part on the ability of the device to repeatedly withstand rotational loads imposed on the device each time at least one rotating electrode is clamped onto workpieces, during which the load applied by the rotating electrode must be prevented from overloading the components that provide for force and movement equalization. As another example, Waltonen provides the advantage of preventing high loads from being applied to the camming device that controls the movement and orientation of a moving electrode. However, the construction of the disclosed welding gun is prone to mispositioning of the electrodes relative to each other and the workpiece due to twisting of the structural members under high application loads, which is detrimental to the pins and bearings that hold the assembly together.

Accordingly, what is needed is a durable apparatus that provides equalized movement and loading of a pair of contacts, such as resistance welding electrodes, brought into contact with a workpiece, such that the loads imposed by the electrodes on the workpiece will be substantially equal and will not overload the mechanism providing movement and force equalization.

SUMMARY OF THE INVENTION

According to the present invention there is provided an apparatus for contacting and applying a force to opposite sides of a workpiece, such as a resistance welding device adapted for use on an automated assembly line. The apparatus is configured to be extremely rigid to ensure accurate movement and positioning of a pair of contacts with respect to a workpiece. Movement of each contact relative to the workpiece provides for clearance between the workpiece and the contacts as the workpiece is loaded. The apparatus also provides for force equalization of the contacts against the workpiece, and thus minimizes the likelihood of deforming the workpiece. Accordingly, the apparatus of the present invention is well suited for resistance welding workpieces of thin sheet metal such as that used for automobile body panels.

The force-applying apparatus of this invention generally includes a frame member supported by a base with first and second shafts that are secured to the frame member and slidably supported by the base. The second shaft is spaced apart and approximately parallel to the first shaft, and prevents rotation of the frame member about the first shaft during operation of the apparatus. The apparatus further includes a device for biasing the frame member away from a first position relative to the base (e.g., a distal position relative to the workpiece) and toward a second position relative to the base (e.g., a position nearer the workpiece). An extendible member and a link are both pivotably mounted to the frame member. The link has a portion engaged with the base when the link is in a first rotational position, and disengaged with the base when the link is in a second rotational position. When engaged with the base, the link overcomes the biasing force applied to the frame member and forces the frame member toward or into its first position relative to the base, e.g., away from the workpiece. When the link is disengaged from the base, the frame member is biased toward or into its second position relative to the base, e.g., toward the workpiece. The frame member supports a first contact, such that engagement and disengagement of the link with the base causes the contact to move away and toward, respectively, the workpiece.

The apparatus further includes a body that is pivotably mounted at a first pivot point to the extendible member, and is also pivotably mounted at a second pivot point to the link. A second contact is mounted to the body. A camming device is mounted to the frame assembly for causing the body to move along a first path as the extendible member extends and as the link disengages the base to cause the frame member to move toward its second position. Thereafter, the camming device causes the body to rotate about the second pivot point on the link, causing the second contact on the body to move toward the first contact on the frame member.

As described above, the apparatus can be termed an equalizing cam rocker fixture assembly. A significant advantage of the apparatus of this invention is that accurate movement of the contacts toward each other is promoted by the rigidity of the frame member, which is greatly enhanced by the manner in which the frame member is mounted and supported to the base by two separate shafts. The first shaft effectively supports the frame on the base, while the second shaft performs as an anti-rotational element that prevents the frame member from rotating about the first shaft, thereby preventing the frame member from twisting in such a manner that would reduce the precision with which the contacts are moved and shorten the service life of the apparatus due to fatigue and wear.

In addition, and according to a preferred aspect of this invention, the link is mounted to the frame member between a pair of arms projecting from the frame, with wear plates mounted to the link and in sliding contact with the arms. In so doing, the rigidity of the link and body assembly is greatly enhanced, which again promotes the precision with which the contacts are moved toward each other while also promoting the service life of the apparatus.

Accordingly, it is an object of the present invention to provide an apparatus for contacting and applying a force to opposite sides of a workpiece, such as a resistance welding device adapted for use on an automated assembly line.

It is a further object of the invention that the apparatus includes a pair of contacts whose movement and force are equalized relative to the workpiece.

It is still a further object of the invention that the apparatus includes enhancements that promote its rigidity, thereby promoting the accuracy with which the apparatus moves and positions the contacts with respect to a workpiece.

It is another object of the invention that the apparatus also provides for force equalization of the contacts against the workpiece, and thus minimizes the likelihood of deforming the workpiece.

Other objects and advantages of this invention will be more apparent after a reading of the following detailed description taken in conjunction with the drawings provided.

DETAILED DESCRIPTION OF THE PREFERRED EMBODIMENT

Figure 1:
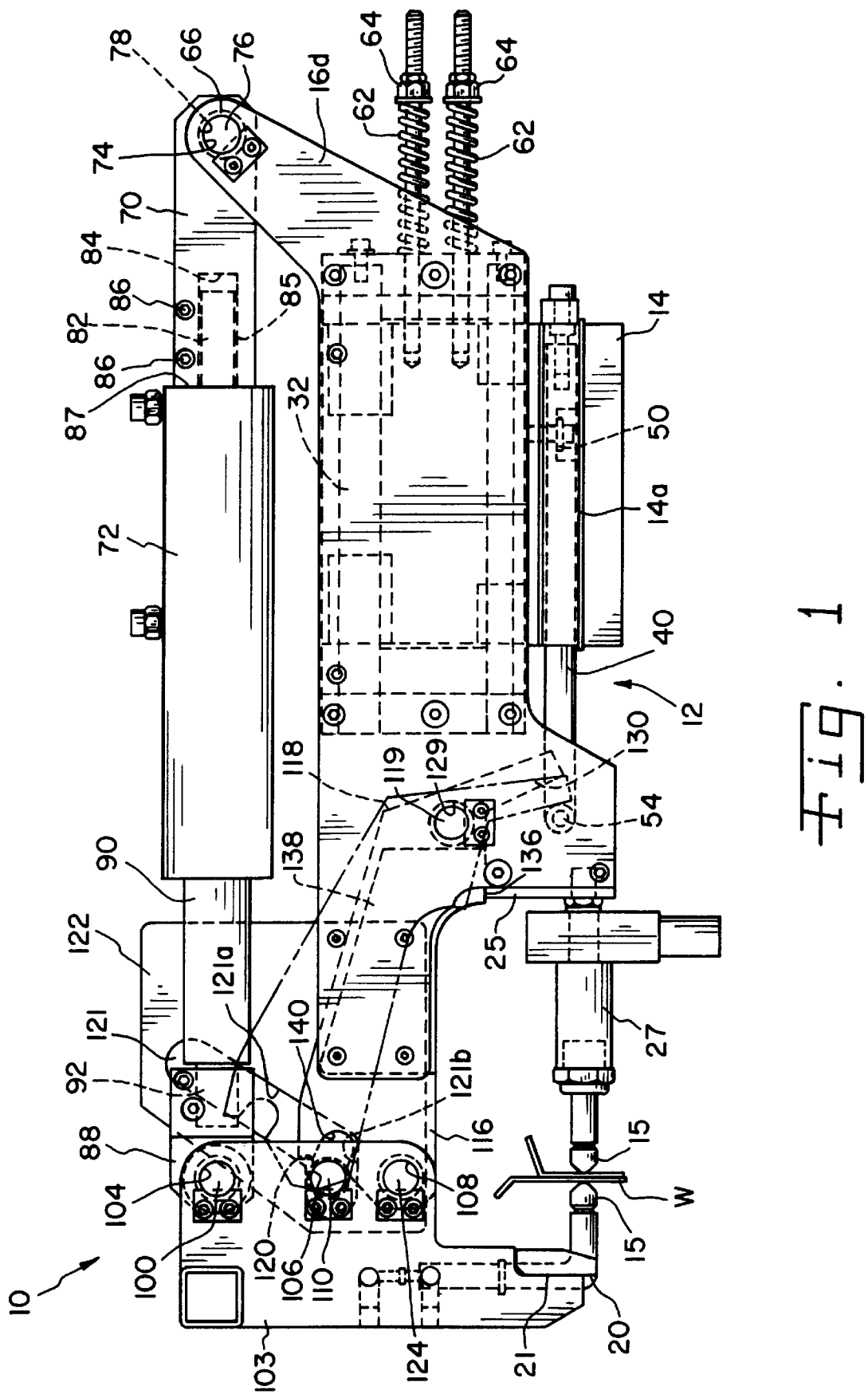
FIG. 1 is a side view of a resistance welding device or gun in accordance with a preferred embodiment of this invention.
Figure 2:
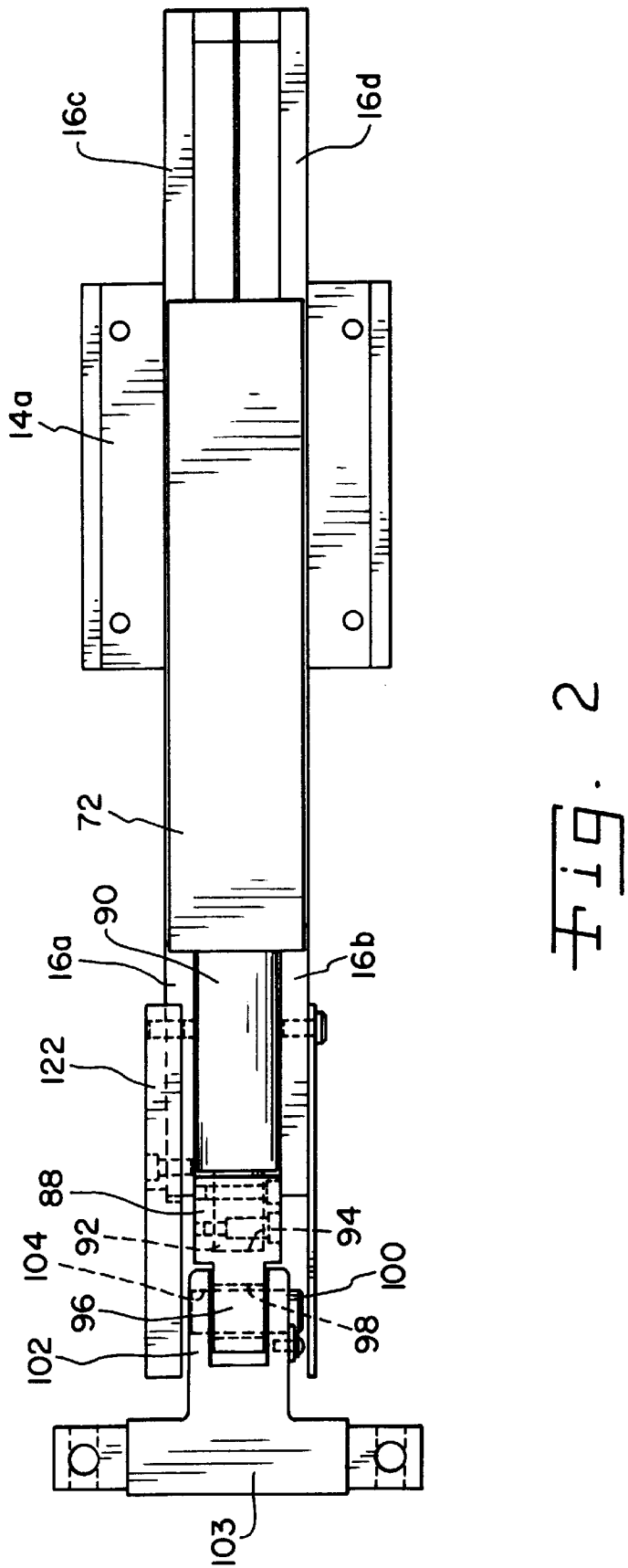
FIG. 2 is a top view of the welding device of FIG. 1.

With reference to FIGS. 1 and 2, there is shown an equalizing cam rocker fixture assembly in accordance with the preferred embodiment of the present invention. Prior to disclosing the details of the invention, it is to be understood that the invention is not limited in its application to the special construction and arrangement of the preferred embodiment as illustrated in the accompanying drawings, since the invention is capable of other embodiments and of being practiced or carried out in various ways. Also, it is to be understood that the phraseology and terminology employed herein is for the purpose of disclosing the preferred embodiment and not a limitation. The preferred embodiment disclosed is the application of the invention in a resistance welding environment. A person skilled in the art will easily recognize that the invention can be used as a clamp, piercing unit, or forming device.

As best shown in FIG. 1, an equalizing cam rocker resistance welding gun 10 includes a pair of electrode tips 15 mounted to an upper electrode support 20 and a lower electrode support 25. The welding gun 10 operates to move the electrode tips 15 toward and away from a workpiece W, shown in FIG. 1 as being contacted on opposite sides by the electrode tips 15. The welding gun 10 incorporates a mounting frame 12 of generally box shape construction having a suitable base plate 14 with appropriate provisions to mount the unit in position on any desired support structure (not shown). As best shown in FIGS. 3 through 5 and 7, the mounting frame 12 includes two generally parallel side plates 16a and 16b which are separated by spacers 18 and 22 mounted between the side plates 16a and 16b in opposing relationship to each other. The side plates 16a and 16b are attached to the spacers in any appropriate manner such as by the bolts shown. Each of the spacers 18 and 22 has an upper aperture 24 and a lower aperture 26. The upper aperture 24 in the spacer 18 is a through hole while the upper aperture 24 in the spacer 22 is a blind hole. A similar arrangement is provided for the lower apertures 26. The upper apertures 24 receive a main support guide shaft 28 while the lower apertures 26 have mounted therein an anti-rotation shaft 30 for a purpose to be described hereinafter. Bolts are mounted into the end of the spacer 22 to secure the main support guide shaft 28 and anti-rotation shaft 30 in the upper and lower apertures 24 and 26 of the spacers 18 and 22.

Figure 7:
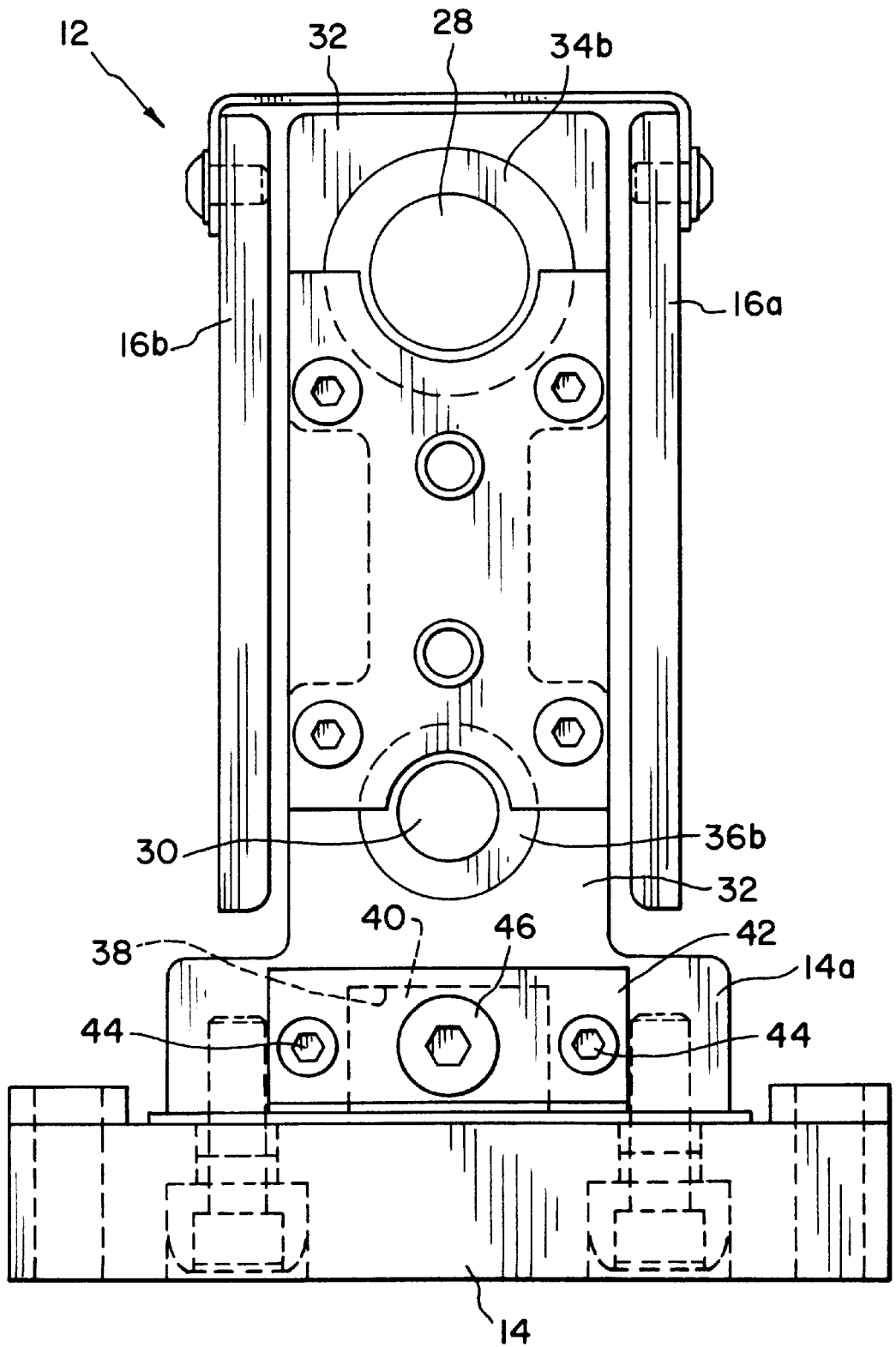
FIG. 7 is a cross-sectional view of the mounting frame taken along line 7—7 of FIG. 3.

Secured to the base plate 14 is a sub-base 14a, as more readily seen in FIG. 7. An upright portion 32 of the sub-base 14a extends upright between the two side plates 16a and 16b into a relief 17a and 17b provided in the side plates 16a and 16b. The upright portion 32 is provided with upper and lower apertures into which are press fit upper bearings 34a and 34b and lower bearings 36a and 36b, respectively. The upper bearings 34a and 34b receive the main support guide shaft 28 while the lower bearings 36a and 36b receive the anti-rotation shaft 30, such that the mounting frame 12 can slide relative to the sub-base 14a and its associated upright portion 32, with movement of the mounting frame 12 being limited by the spacers 18 and 22 as the upper and lower bearings 34a and 34b and 36a and 36b, respectively, guide and support the upright portion 32 on the main support guide shaft 28 and anti-rotation shaft 30.

Figure 4:
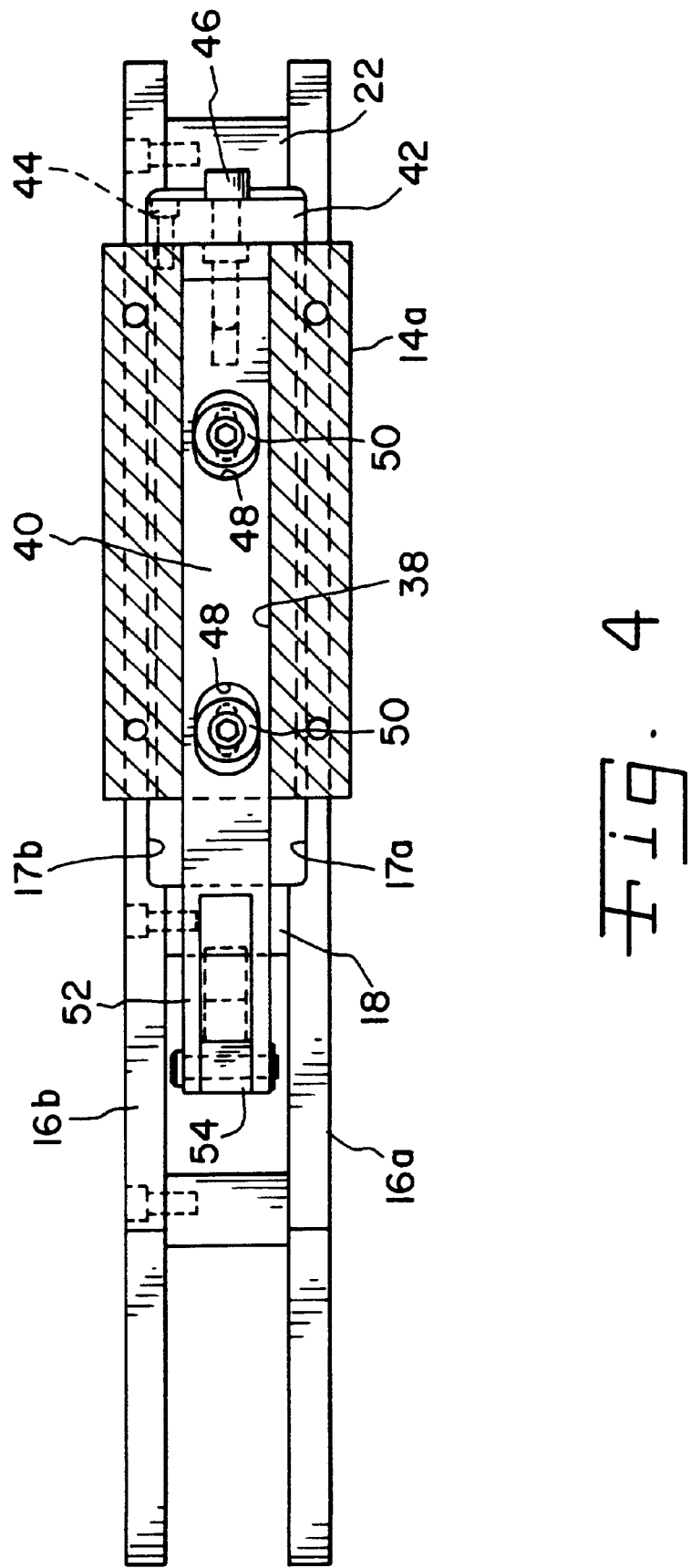
FIG. 4 is a bottom view of the mounting frame taken along line 4—4 of FIG. 3.
Figure 5:
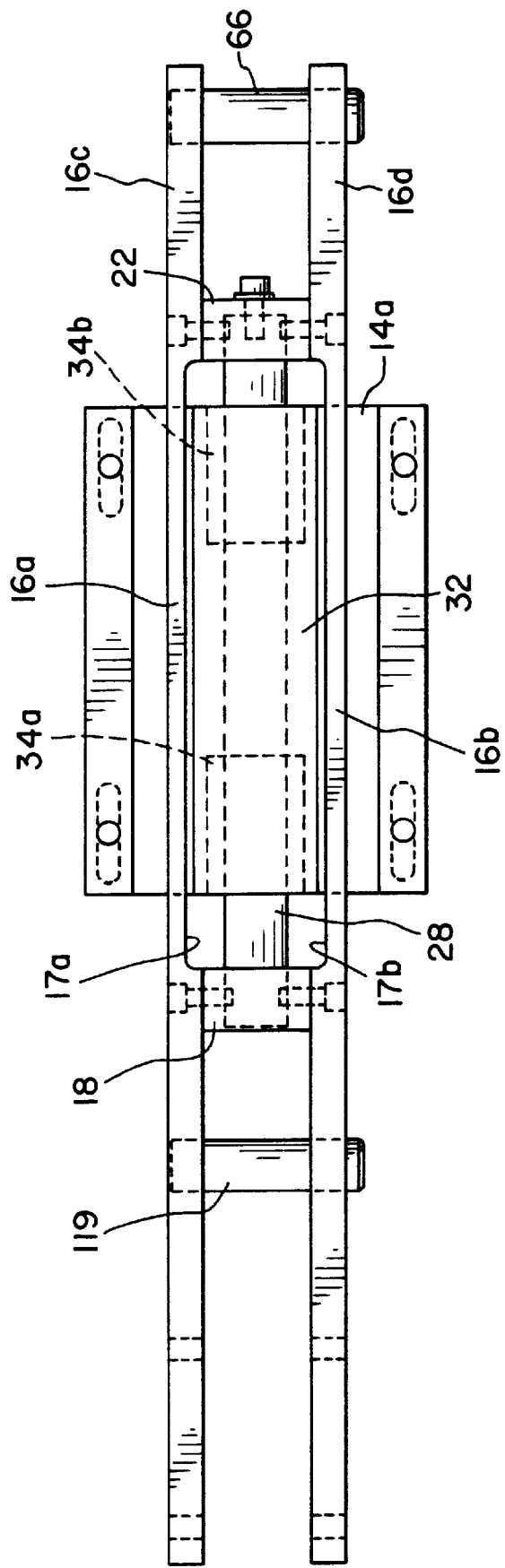
FIG. 5 is a top view of the mounting frame of FIG. 3.

With reference to FIGS. 4 and 7, the bottom of the sub-base 14a has a longitudinal slot 38 along the entire length thereof Mounted within the longitudinal slot 38 is a slide 40 which is secured to the sub-base 14a in any appropriate manner, such as a cap 42 attached to the sub-base 14a with bolts 44. An adjustment screw 46 is mounted to the slide 40 through the cap 42 to provide for adjustment of the slide 40 relative to the sub-base 14a and upright portion 32, as shown in FIG. 4. This adjustment is further accommodated by the use of a pair of slots 48 in the slide 40. In each slot 48 is mounted a washer 50 attached to the sub-base 14a so as to limit the adjustment of the slide 40 within the slot 38 and with respect to the sub-base 14a and the base plate 14.

Figure 3:
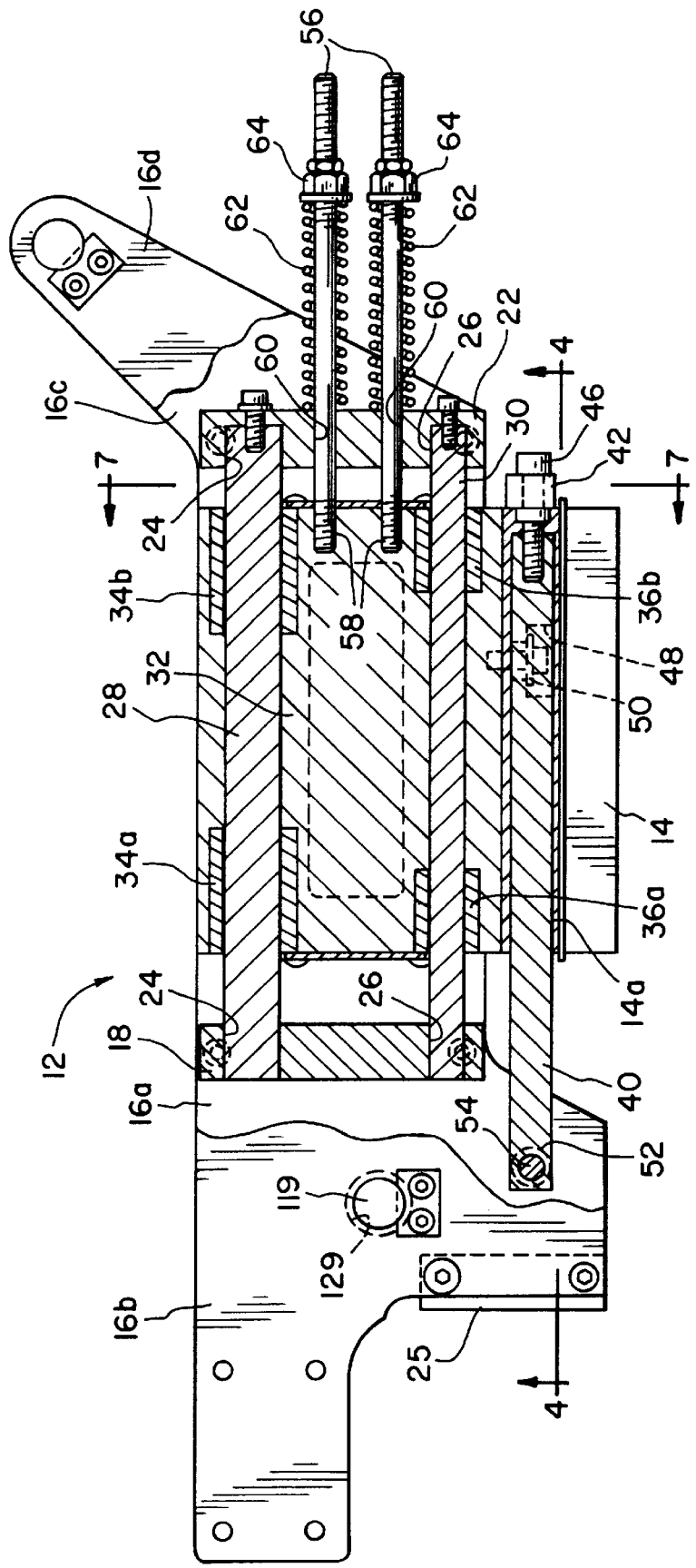
FIG. 3 is a side view of the mounting frame of the welding gun of FIG. 1.

As shown in FIGS. 1, 3 and 4, the slide 40 terminates at an end opposite the cap 42 in a clevis 52 with a roller 54 mounted thereinbetween for a purpose to be described hereinafter. The mounting frame 12 is biased with respect to the sub-base 14a and upright portion 32 by the use of two screws 56 mounted into tapped holes 58 in the end of the upright portion 32 adjacent the spacer 22. Clearance holes 60 are provided in the spacer 22 to permit the screws to extend in a direction away from the upright portion 32 of the sub-base 14a. A coil spring 62 is mounted on each of the screws 56 along with a threaded retaining nut 64 so as to compress the coil springs 62 between the spacer 22 and the retaining nuts 64, thereby biasing the mounting frame 12 in a forward direction toward the workpiece W (leftward in FIG. 1) with the spacer 22 urged toward the upright portion 32.

The side plates 16a and 16b terminate in upright extended portions or arms 16c and 16d, as shown in FIGS. 1, 2, 3 and 5. FIG. 1 shows a bearing spacer 66 mounted between the arms 16c and 16d, to which is attached one end of a connecting bracket 70 of a dual acting air cylinder 72. The upright extended arms 16c and 16d are apertured at 74 to receive a pivot pin 76 received in the bearing spacer 66. The back end of the connecting bracket 70 is also apertured at 78 to receive the bearing spacer 66, which allows the connecting bracket 70 to pivot with respect to the pivot pin 76. A stud projection 82 extends axially from the rear end of the air cylinder 72 into an aperture 84 in the connecting bracket 70. The back end of the cylinder 72 is secured with the upright extended portions of arms 16c and 16d by means of the connecting bracket 70, aperture 84, and stud projection 82 by bolts 86.

Figure 6:
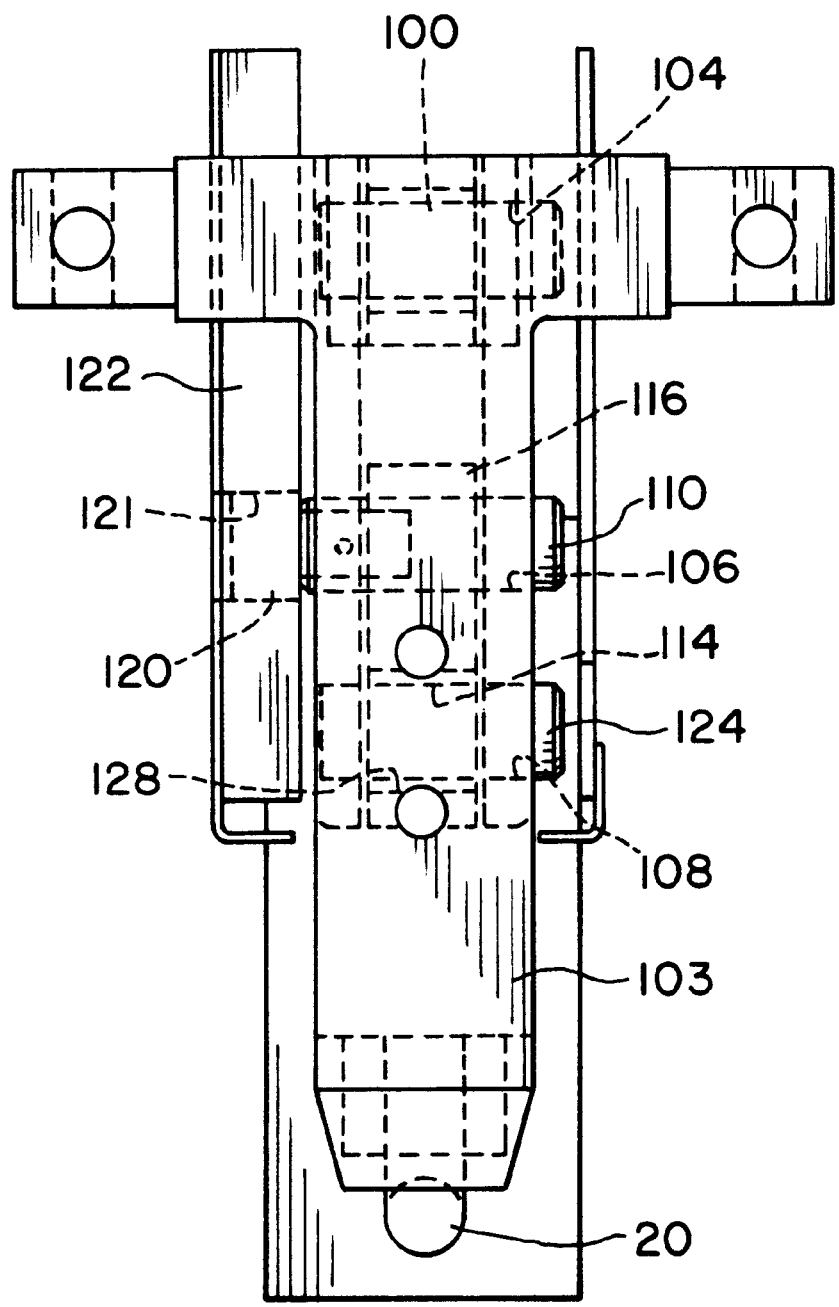
FIG. 6 is a front view of the welding device of FIG. 1.

With reference to FIGS. 1, 2 and 6, at the front of the air cylinder 72, a clevis 88 is attached to the forward end of a piston rod 90 by way of a stud projection 92 (seen in FIG. 2) on the piston rod 90 received in an aperture 94 in the clevis 88 and locked thereon with bolts similar to the arrangement at the rear of the piston rod with the connecting bracket 70, as is well known in the prior art. Apertures 84 and 94 are purposely not threaded to permit unrestricted orientation of the air cylinder 72 and associated fluid input ports. Therefore, the air cylinder 72 can be reoriented at installation to accommodate the radial orientation of the fluid supply lines. The connecting bracket 70 also has an insulating bushing 85 mounted within the aperture 84 and an insulating disc 87 to electrically isolate the air cylinder 72. A similar insulating bushing and insulating disc are used in the aperture 94 receiving the front of the piston rod 90, the stud projection 92, and the aperture 98 in a forward projection 96 of the clevis 88.

The forward projection 96 has an aperture 98 therein that receives a pivot pin 100 mounted in a clevis portion 102 of an anvil 103 having the upper electrode support portion 20 attached to one end thereof. The clevis portion 102 of the anvil 103 has three apertures 104, 106 and 108. The upper aperture 104 is in line with the aperture 98 of the clevis 88 for receiving the pivot pin 100 in order to securely lock the anvil 103 in a pivotable relationship with respect to the clevis 88 mounted to the piston rod 90 of the air cylinder 72. Appropriate bushings and spacers are mounted to the pivot pin 100 to provide insulated friction-free pivoting of the anvil 103 with respect to the clevis 88 as is well known in the prior art. The middle aperture 106 in the clevis portion 102 of the anvil 103 receives a pivot pin 110 which is press fit into the aperture 106, with one end thereof extending beyond the outer face of the clevis portion 102 for a purpose to be described hereinafter. As best shown in FIGS. 1 and 6, the bottom aperture 108 is aligned with an aperture 114 of a link 116 mounted between the side plates 16a and 16b and attached thereto at an opposite end 118 by way of a bushed pivot pin 119 mounted in the side plates 16a and 16b. The link 116 pivots about the pivot pin 119 connection with the side plates 16a and 16b as the air cylinder 72 is operated from a beginning of travel position to an end of travel position.

As set forth above, the center aperture 106 has a pivot pin 110 mounted therein which extends beyond the clevis portion 102 of the anvil 103. As shown in FIGS. 1 and 6, a cam roller 120 is mounted to the pivot pin 110 and extends into a guide track 121 of a cam plate 122 which is attached to the side of the side plate 16a. In the alternative, the cam plate 122 may be attached to the side plate 16b. In such a case, the cam roller 120 would extend from the clevis portion 102 of the anvil 103 in an opposite direction so as to extend into the guide track 121 of the cam plate 122. Whether the cam plate 122 is attached to the side plate 16a or 16b does not in any way affect the functioning of the equalizing cam rocker resistance welding gun 10.

The link 116 is attached at one end to the anvil 103 by a pivot pin 124 mounted in the lower aperture 108 of the clevis portion 102 of the anvil 103 and an appropriate bushing mounted within an aperture 128 of the link 116 so as to enable pivoting of the link 116 with respect to the anvil 103 as well as the side plates 16a and 16b. Above the pivot pin 124, a slot 140 is formed in the end of the link 116 for supporting the cam roller 120 as the cam roller 120 travels within an arcuate portion 121a of the guide track 121. The opposite end 118 of the link 116 also has an aperture 129 in which is mounted the bushed pivot pin 119 which extends into apertures in the side plates 16a and 16b. Again, since the link 116 pivots with respect to the side plates 16a and 16b, an appropriate bushing arrangement is utilized to accommodate pivotable movement of the link 116 with respect to the pivot pin 124 and the bushed pivot pin 119. According to a preferred aspect of this invention, the link 116 includes a pair of wear plates 138 on its opposing surfaces, with each wear plate 138 being in sliding contact with one of the side plates 16a and 16b. The wear plates 138 promote the rigidity of the welding gun 10 by minimizing lateral movement of the link 116 relative to the side plates 16a and 16b and, therefore, the mounting frame 12. Suitable sacrificial wear-resistant materials for the wear plates 138 are known, with preferred wear plates 138 being formed of wear-resistant plastic materials.

As shown in FIGS. 1 and 3, the link 116 has a lower extended lever portion 130 on the opposite end 118 which, as the link 116 pivots, comes into contact with the roller 54 mounted on the clevis 52 of the forward end of the slide 40. As the link 116 rotates clockwise, the link 116 forces the mounting frame 12, against the biasing effect of the coil springs 62, to move away from the workpiece W (rightward in FIG. 1) as a result of the lower extended lever portion 130 pushing against the roller 54, whose location relative to the sub-base 14a is fixed by the adjustment screw 46, as described above. Accordingly, the movement of the mounting frame 12 with respect to the sub-base 14a is in a linear direction along the main support guide shaft 28, anti-rotation shaft 30 and slide 40, and is caused by the link 116 working against the bias of the spring force generated by the coil springs 62. When the lower extended lever portion 130 is disengaged with the roller 54, the mounting frame 12 can move with respect to the upright portion 32 and sub-base 14a as a result of against the bias of the coil springs 62. As such, contact of the electrode tip 15 with the workpiece W is initially only under the force of the coil springs 62, thereby reducing the likelihood of damage to the workpiece W that might otherwise occur from high eccentric loading.

The lower electrode support 25 is mounted between the side plates 16a and 16b so as to provide an attachment for a lower electrode holder assembly 27 with appropriate provisions for providing insulation, cooling, and power to the electrode, as is well known in the art. The lower electrode holder assembly 27 is secured to the lower electrode support 25 such that the electrode tip 15 extends in a forward direction toward the workpiece W. Similarly, an electrode holder or clamp 21 is mounted to the lower portion of the anvil 103 with the electrode tip 15 extending therefrom which provides appropriate power, cooling and insulation to the upper electrode. A peripheral surface 136 of the link 116 bottoms out on the top surface of the lower electrode support 25 as the link 116 pivots to its most counterclockwise position, as will be described hereinafter.

OPERATIONAL DESCRIPTION

The operation of the equalizing cam rocker resistance welding gun 10 will now be described, beginning with the piston rod 90 completely retracted within the air cylinder 72 at which the anvil 103 is at a topmost position and pivoted about the pivot pin 100 located in the upper aperture 104 of the anvil 103. The link 116 is at its most clockwise position as shown in phantom lines in FIG. 1, and the lower extended lever portion 130 is moved in its most forward position, thereby engaging the roller 54 and attached slide 40 to push the mounting frame 12 against the force of the coil spring 62 away from the area where the workpiece W is loaded. The cam roller 120 is supported in the slot 140 in the link 116, such that the weight of the anvil 103 is not supported by the guide track 121 through the roller 120.

Starting from this position, after the workpiece W is moved into position with a portion thereof between the electrode tips 15 as shown in FIG. 1, pressure fluid (such as air) is introduced into the right end of the air cylinder 72. This causes the piston rod 90 to move to the left as viewed in FIG. 1 relative to the air cylinder 72. The clevis 88 moves with the piston rod 90 in a forward direction, and by attachment the anvil 103 moves therewith. Since the cam roller 120 attached to the pivot pin 110 is supported by the slot 140 in the link 116 and guided by the guide track 121 in the cam plate 122, the cam roller 120 follows the upper/forward surface of the arcuate portion 121a of the guide track 121 and begins to lower the anvil 103. At the same time, the link 116 begins to move counterclockwise to a point where the lower extended lever portion 130 disengages from the roller 54 attached to the slide 40. As this occurs, the mounting frame 12 is allowed to float forward and the lower electrode holder 27 and associated electrode tip 15 are moved, by the bias of the coil springs 62, into contact with one side of the workpiece W.

As the cam roller 120 continues to follow the arcuate portion 121 a of the guide track 121 and the piston rod 90 continues its extension, the anvil 103 continues its downward motion until the cam roller 120 reaches the bottom end of the arcuate portion 121 a of the guide track 121 and, simultaneously, the peripheral surface 136 of the link 116 bottoms out on the lower electrode support 25. After the peripheral surface 136 of the link 116 has bottomed out on the lower electrode support 25, the roller 120 has reached its limit of movement along the arcuate portion 121a of the guide track 121 and the final motion of the anvil 103 is completely restricted to a rocking or pivoting motion about the pivot pin 124 mounted in the lower aperture 108 which rocks the upper electrode support 20 into place against the workpiece W. During this time, the cam roller 120 exits the slot 140 in the link 116 and moves into a transverse portion 121b of the guide track 121 while the piston rod 90 completely extends to apply the necessary force to the workpiece W while the weld is made. The continued introduction of pressure fluid into the right end portion of the air cylinder 72 establishes the necessary pressure on the electrode tips 15 and workpiece W for carrying out a welding operation. Of significance, none of the welding loads are carried by the cam roller 120 in the guide track 121 since the peripheral surface 136 of the link 116 has bottomed out on the lower electrode support 25, so that all of the welding loads are carried by the pivot pin 124 mounted in the lower aperture 108 of the clevis portion 102 of the anvil 103 as well as the forward portion of the link 116 and bushed pivot pin 119.

According to a preferred aspect of the invention, during extension of the piston rod 90 and movement of the mounting frame 12 on the sub-base 14a, the anti-rotation shaft 30 prevents the mounting frame 12 from rotating about the guide shaft 28, and the guide shaft 28 and the anti-rotation shaft 30 cooperate to prevent the mounting frame 12 from shifting and twisting to the extent that the electrode tips 15 are pulled out of alignment with each other and out of their intended contact position with the workpiece W. Furthermore, alignment of the anvil 103 relative to the mounting frame 12 and workpiece W is promoted by the precision with which the link 116 moves relative to the mounting frame 12 as a result of the wear plates 138 inhibiting twisting of the link 116 between the side plates 16a and 16b. The end result is that the rigidity of the welding gun 10 is greatly enhanced, thereby promoting the precision of its operation and service life.

In addition, during movement of the electrode tips 15 toward the workpiece W, there is at no time an excessive high force on the workpiece W that would deform the workpiece W, since during this movement the mounting frame 12 floats under the influence of the bias of the coil springs 62. Thus, when the lower electrode holder 27 and its associated tip 15 first contact the workpiece W, there is only a very small force exerted by the coil springs 62, and when the upper electrode holder 21 thereafter comes into contact with the workpiece W, as equalizing force to the bias of the spring force is exerted between the upper and lower electrode tips 15. This equalizing force carries through the upper electrode support 20, anvil 103, clevis 88, piston rod 90, air cylinder 72 and the upright extending portions 16c and 16d attached to the mounting frame 12, so that there is no possibility of deforming a thin workpiece W as the electrodes tips 15 come into contact therewith. This action is of great significance when using the unit as a welding gun for very thin workpiece structures since any bending or deformation of the workpiece might cause permanent warpage and an unsatisfactory weld or product. Accordingly, pressure equalization is effected by the unit in grasping the workpiece W to prevent deformation or damage to a workpiece W during the initial contact of the electrode tips 15 with the workpiece W so as to enable performing an appropriate welding operation.

By the use of the pressure equalization feature, regardless of the exact position of the workpiece W when it is initially loaded onto the fixture, the electrode tips 15 will always equalize on both sides of the workpiece W without damage thereto. Usually, and by intent, the workpiece W will be initially located in the fixture with one face thereof as close as possible to the lower electrode holder 27 and associated tip 15 so that there will be little movement of this electrode tip 15 when pressure fluid is fed into the right end of the air cylinder 72 to bring the upper electrode holder 21 into position. However, with a large workpiece W that is to be simultaneously welded at a very large number of points by a series of banks of the illustrated welding units 10, it is difficult for each of the various electrode tips 15 to be initially set in the same position relative to the workpiece. Thus, the workpiece W may vary as to its dimension at various points on its periphery, the various welding units may be offset slightly from one another in a longitudinal direction, and the various electrode tips 15 may at any time be worn away to different extents or degrees. As above described, these various factors do not interfere with the operation of the unit because the pressure equalization feature is obtained irrespective of the exact starting position of each of the electrode tips 15 with their associated holders. Thus, whatever the exact starting position of an electrode tip 15 relative to the workpiece W, the forces of the coil springs 62 will, as soon as fluid is introduced into the air cylinder 72, bias the mounting frame 12 into position wherein the lower electrode holder 27 and associated tip 15 are lightly engaged with the workpiece W under the spring force influence.

As previously noted, the biasing action of the coil springs 62 does not become effective on the mounting frame 12 until the pressure fluid is introduced into the air cylinder 72, for the reason that the lower extended lever portion 130 of the link 116 is engaged with the roller 54 and associated slide 40 to prevent such biasing action from moving the mounting frame 12. Location of the position of the roller 54 may be changed by adjustment of the adjustment screw 46 and it will be seen that, by this adjusting operation, the starting positions of the electrodes 15 or the spacings thereof may be varied to suit the conditions of the specific application.

While the invention has been described in terms of a preferred embodiment, it is apparent that other forms could be adopted by one skilled in the art. Accordingly, the scope of the invention is to be limited only by the following claims.

What is claimed is:

1. An apparatus for contacting and applying a force to opposite sides of a workpiece, said apparatus comprising:

a base;

a frame member supported by said base;

first and second shafts secured to said frame member and slidably supported by said base, said second shaft being spaced apart and approximately parallel to said first shaft, said second shaft preventing rotation of said frame member about said first shaft;

means for biasing said frame member away from a first position relative to said base and toward a second position relative to said base;

an extendable member pivotably mounted to said frame member;

a link pivotably mounted to said frame member to have a first rotational position and a second rotational position, said link having a portion engaged with said base when said link is in said first rotational position so as to overcome said biasing means and force said frame member toward said first position relative to said base, said portion of said link being disengaged with said base when said link is in said second rotational position such that said biasing means causes said frame member to move toward said second position relative to said base;

a body pivotably mounted at a first pivot point to said extendable member and pivotably mounted at a second pivot point to said link;

a first contact mounted to said frame member;

a second contact mounted to said body; and camming means mounted to said frame member for causing said body to move along a first path as said extendable member extends and as said portion of said link disengages said base to cause said frame member to move toward said second position thereof, and thereafter said camming means causing said body to rotate about said second pivot point so as to move said second contact toward said first contact.

2. The apparatus of claim 1, wherein said biasing means biases said frame member away from said workpiece, said second position of said frame member being a position nearer said workpiece.

3. The apparatus of claim 1, wherein said base comprises an adjustable member adjustably secured to said base, said adjustable member having a bearing portion, said portion of said link engaging and disengaging said bearing portion of said adjustable member as said link rotates between said first and second rotational positions.

4. The apparatus of claim 1, further comprising a support member to which said base member is mounted.

5. The apparatus of claim 4, further comprising means for adjustably mounting said base to said support member.

6. The apparatus of claim 4, wherein said second shaft is closer to said support member than said first shaft.

7. The apparatus of claim 1, further comprising a wear member mounted to said link and in sliding contact with said frame member.

8. The apparatus of claim 1, wherein said link is pivotally mounted to said frame member with a pivot member, said portion of said link and said second pivot point of said link being disposed on opposite sides of said pivot member.

9. The apparatus of claim 1, further comprising means for limiting rotation of said link relative to said frame member after said portion of said link disengages with said base.

10. The apparatus of claim 1, wherein said apparatus is a welding device for contacting opposite sides of said workpiece for welding said workpiece.

11. An apparatus for contacting and applying a force to opposite sides of a workpiece, said apparatus comprising:

a frame having an interior region;

first and second shafts secured within said interior region, said second shaft being spaced apart and approximately parallel to said first shaft;

a base having a first portion adjacent said frame and a second portion projecting into said interior region of said frame, said first and second shafts being slidably connected to said second portion of said base so as to slidably support said frame on said base, said second shaft being closer to said first portion of said base than said first shaft, said second shaft preventing rotation of said frame about said first shaft;

means for biasing said frame away from a first position farthest from said workpiece and toward a second position nearest said workpiece;

an extendable member pivotably mounted to said frame;

a link pivotably mounted to said frame so as to have an axis of rotation, a first rotational position and a second rotational position, said link having a first portion engaged with said base when said link is in said first rotational position so as to overcome said biasing means and force said frame toward said first position thereof, said first portion of said link being disengaged with said base when said link is in said second rotational position such that said biasing means causes said frame to move toward said second position thereof, said link having a second portion disposed opposite said first portion relative to said axis of rotation;

means for limiting movement of said link when said first portion of said link is disengaged with said base;

an anvil pivotably mounted to said extendable member at a first pivot point and pivotably mounted to said second portion of said link at a second pivot point, said anvil having a cam follower mounted thereto;

a first contact mounted to said frame;

a second contact mounted to said anvil; and a cam track secured to said frame and engaged by said cam follower, said cam track having a first track portion and a second track portion, said cam follower residing in said first track portion as said extendable member extends until after said portion of said link disengages said base to cause said frame to move toward said second position thereof and movement of said link is limited by said limiting means, and thereafter said cam follower residing in said second track portion so as to cause said anvil to rotate about said second pivot point and move said second contact toward said first contact.

12. The apparatus of claim 11, wherein said biasing means is secured to said second portion of said base between said first and second shafts.

13. The apparatus of claim 11, wherein said link comprises means for receiving said cam follower when said cam follower resides within said first track portion, said receiving means permitting said cam follower to disengage said receiving means when said cam follower travels through said second track portion of said cam track during which time said anvil rotates about said second pivot point.

14. The apparatus of claim 11, wherein said base comprises an adjustable member adjustably secured to said base, said adjustable member having a bearing portion, said first portion of said link being engageable and disengageable with said bearing portion of said adjustable member.

15. The apparatus of claim 14, further comprising a support member to which said first portion of said base member is mounted.

16. The apparatus of claim 15, wherein said base is adjustably mounted to said support member with said adjustable member.

17. The apparatus of claim 11, wherein said frame comprises a pair of arms projecting toward said anvil, said link being disposed between said pair of arms.

18. The apparatus of claim 17, further comprising a pair of wear members mounted to said link, each of said wear members being in sliding contact with one of said pair of arms of said frame.

19. The apparatus of claim 11, wherein said apparatus is a welding device for contacting opposite sides of said workpiece for welding said workpiece.

20. A welding apparatus for contacting and applying a force to opposite sides of a workpiece for welding said workpiece, said welding apparatus comprising:

a frame having a first end, a second end, and an interior region between said first and second ends;

a pair of arms projecting from said first end of said frame;

a base having a first portion adjacent said frame and a second portion projecting into said interior region of said frame;

first and second shafts within said interior region of said frame and secured to said first and second ends of said frame, said first and second shafts being slidably connected to said second portion of said base so as to slidably support said frame on said base, said second shaft being spaced apart and approximately parallel to said first shaft, said second shaft being closer to said first portion of said base than said first shaft, said second shaft preventing rotation of said frame about said first shaft;

a sliding member adjustably secured to said first portion of said base, said sliding member having a bearing portion adjacent said first end of said frame;

means for biasing said frame away from a retract position in which said second portion of said base is adjacent said first end of said frame, and toward a deploy position in which said second portion of said base is adjacent said second end of said frame;

stroking means pivotably mounted to said second end of said frame;

a link disposed between said pair of arms of said frame, said link having first and second ends and a pivot point between said first and second ends by which said link is pivotably mounted to said pair of arms of said frame, said link having a first rotational position and a second rotational position, said first end of said link having containment means, said second end of said link being engaged with said bearing portion of said sliding member when said link is in said first rotational position so as to overcome said biasing means and force said frame toward said retract position thereof, said second end of said link being disengaged with said bearing portion of said sliding member when said link is in said second rotational position such that said biasing means causes said frame to move toward said deploy position thereof;

a pair of wear members mounted to said link, each of said wear members being in sliding contact with one of said pair of arms of said frame;

means mounted to said frame for limiting movement of said link when said second end of said link is disengaged with said bearing portion;

an anvil pivotably mounted at a first pivot point to said stroking means and pivotably mounted at a second pivot point to said first end of said link, said anvil having a cam follower mounted thereto;

a first electrode disposed at said first end of said frame;

a second electrode mounted to said anvil; and a cam track engaged by said cam follower of said anvil, said cam track having an arcuate portion and a transverse portion, said cam follower residing in said arcuate portion and in said containment means of said link as said stroking means extends until after said second end of said link disengages said bearing portion of said sliding member to cause said frame to move toward said deploy position and movement of said link is limited by said limiting means, and thereafter said cam follower exiting said containment means and residing in said transverse portion so as to cause said anvil to rotate about said second pivot point and move said second electrode toward said first electrode.

\* \* \* \* \*